(12) United States Patent
Vanni

(10) Patent No.: US 8,636,245 B2
(45) Date of Patent: Jan. 28, 2014

(54) AIRCRAFT

(75) Inventor: Roberto Vanni, Samarate (IT)

(73) Assignee: Agusta S.p.A., Samarate (IT)

(*) Notice: Subject to any disclaimer, the term of this patent is extended or adjusted under 35 U.S.C. 154(b) by 260 days.

(21) Appl. No.: 12/980,919

(22) Filed: Dec. 29, 2010

(65) Prior Publication Data

US 2011/0186691 A1   Aug. 4, 2011

(30) Foreign Application Priority Data

Dec. 30, 2009   (EP) ..................................... 09425544

(51) Int. Cl.
*B64C 27/64* (2006.01)

(52) U.S. Cl.
USPC ...................... 244/17.25; 244/78.2

(58) Field of Classification Search
USPC ....... 244/17.11, 17.13, 60, 75.1, 78.1, 135 R, 244/17.25, 78.2; 303/3, 10–11, 15, 20; 60/451–452
See application file for complete search history.

(56) References Cited

U.S. PATENT DOCUMENTS

| | | | | |
|---|---|---|---|---|
| 4,074,529 A | * | 2/1978 | Budzich | 60/445 |
| 5,673,557 A | * | 10/1997 | Yoshida et al. | 60/421 |
| 6,202,411 B1 | | 3/2001 | Yamashita | |
| 6,209,825 B1 | | 4/2001 | Scott | |
| 2006/0198737 A1 | * | 9/2006 | Matsui et al. | 417/212 |

FOREIGN PATENT DOCUMENTS

| | | |
|---|---|---|
| EP | 0 533 958 A1 | 3/1993 |
| EP | 2 003 056 A2 | 12/2008 |

OTHER PUBLICATIONS

European Search Report of Application No. 09425544 Dated May 28, 2010.

* cited by examiner

*Primary Examiner* — Philip J Bonzell
*Assistant Examiner* — Timothy Schwarz
(74) *Attorney, Agent, or Firm* — Venable LLP; Robert Kinberg; Steven J. Schwarz

(57) ABSTRACT

An aircraft having at least one in-flight attitude control system, in turn having at least one actuator; and a hydraulic circuit connected to the actuator and having at least one pump designed to deliver a first flow when the pressure of the hydraulic circuit is above a presettable threshold value. The pump is designed to deliver a second flow greater than the first flow, and the aircraft has a sensor for detecting a quantity associated with the pressure of the hydraulic circuit; and a programmable central control unit, which controls the pump to deliver the second flow when the quantity detected by the sensor corresponds to a pressure of the hydraulic circuit below the threshold value.

7 Claims, 3 Drawing Sheets

006# AIRCRAFT

CROSS-REFERENCE TO RELATED APPLICATION

This application claims the priority of European Patent Application No: 09425544.5, filed on Dec. 30, 2009, the subject matter of which is incorporated herein by reference in its entirety.

BACKGROUND OF THE INVENTION

The present invention relates to an aircraft. In particular, the aircraft may be one capable of hovering, such as a helicopter or convertiplane.

As is known, helicopters comprise at least one hydraulic circuit; and a number of actuators operated by the hydraulic circuit, and some of which perform essential functions, such as in-flight attitude control, e.g. control the attack angle of the main and/or tail rotor blades. In the event of a malfunction, particularly a fall in pressure to the actuators, the blade attack angle is no longer fully controllable, and the attitude of the helicopter may be seriously impaired.

A fall in hydraulic circuit pressure may have any number of causes. For example, an aircraft normally evolves over a long period of time and a long working life, in the course of which, it is invariably upgraded with new equipment and actuators that must be connected to the existing hydraulic circuit. Though this is designed and certified to allow for such upgrading, original design criteria may sometimes prove poorly conservative, on account of the long working life of the aircraft, rapid developments in technology, and increasing customer demand for better performance.

As a result, the hydraulic circuit as originally designed and certified may be unable to supply actuators with the necessary pressure in all possible operating conditions of the aircraft.

One possible solution is to redesign and recertify the hydraulic system. But this would involve considerable time and money.

A need is therefore felt within the aircraft industry for some way of upgrading aircraft hydraulic equipment, while avoiding the time and cost involved in designing and certifying an upgraded hydraulic system.

SUMMARY OF THE INVENTION

It is an object of the present invention to provide an aircraft designed to meet at least one of the above demands.

According to the present invention, there is provided an aircraft comprising at least one in-flight attitude control system, in turn comprising: at least one actuator; and a hydraulic circuit connected to said at least one actuator and comprising at least one pump designed to deliver a first flow when the pressure of the hydraulic circuit is above a presettable threshold value; said aircraft being characterized in that said pump is designed to deliver a second flow greater than said first flow; and by also comprising: a sensor for detecting a quantity associated with the pressure of said hydraulic circuit; and a programmable central control unit, which controls said pump to deliver said second flow when said quantity detected by said sensor corresponds to a pressure of said hydraulic circuit below said threshold value.

The present invention also relates to a method of controlling an aircraft hydraulic circuit; said hydraulic circuit being connected to at least one actuator, and comprising at least one pump designed to deliver a first flow when the pressure of said hydraulic circuit is above a presettable threshold value; said method being characterized by comprising the steps of detecting a quantity associated with the pressure of said hydraulic circuit; and increasing flow from said pump when the detected quantity corresponds to a pressure of said hydraulic circuit below said threshold value.

The present invention also relates to a method of requalifying an aircraft comprising at least one in-flight attitude control system, in turn comprising at least one actuator; and a hydraulic circuit connected to said at least one actuator; said method being characterized by comprising the steps of connecting said hydraulic circuit to a pump designed to deliver a first flow, and a second flow greater than said first flow; said second flow corresponding to a pressure of said hydraulic circuit greater than the certification pressure of the hydraulic circuit; connecting a sensor to said hydraulic circuit; said sensor detecting a quantity associated with the pressure of said hydraulic circuit; and programming a central control unit to control said pump to deliver said second flow when said quantity detected by said sensor corresponds to a pressure of said hydraulic circuit below a presettable threshold value.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
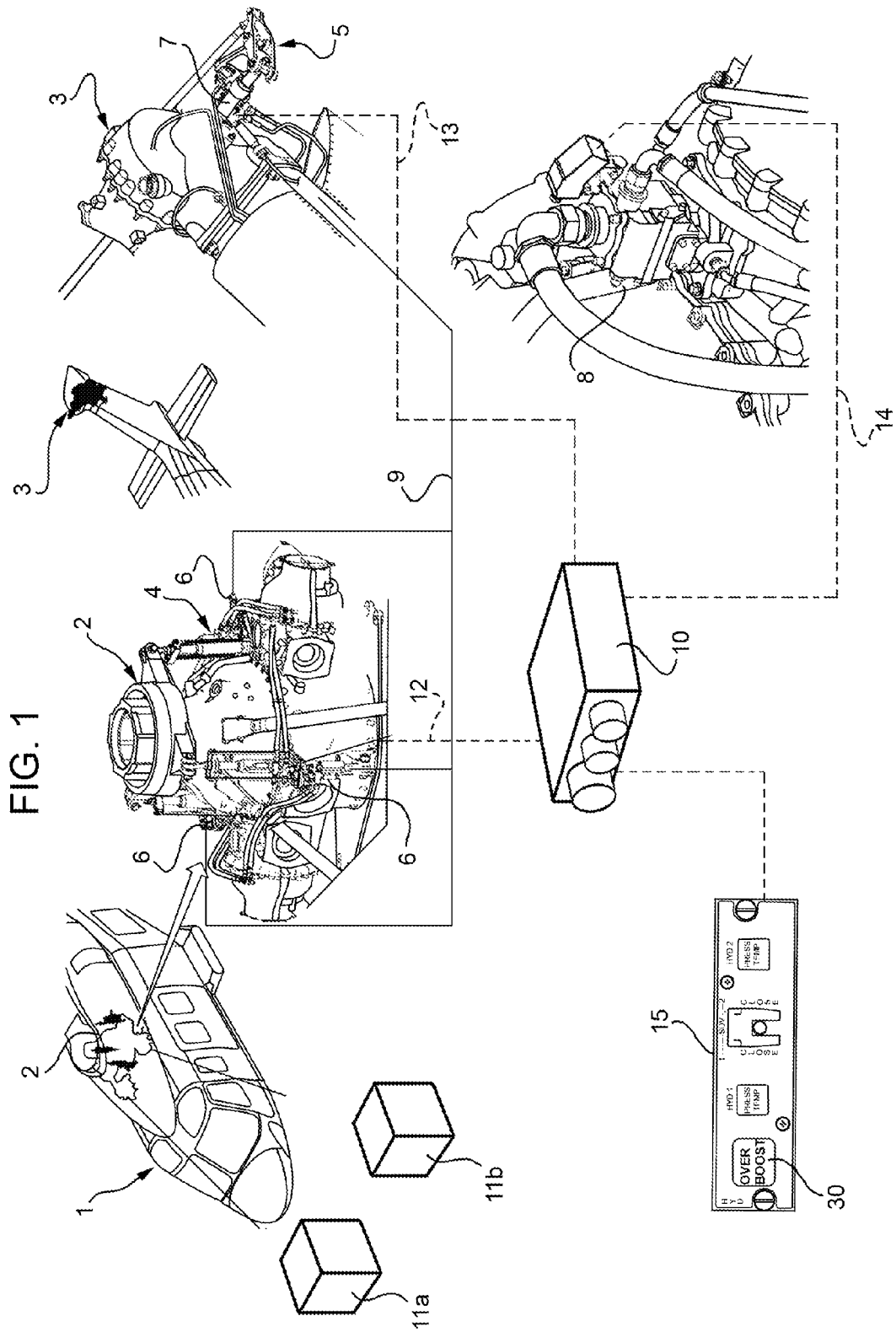
FIG. 1 shows a schematic overall view of the component parts of the circuit according to the present invention.

Number 1 in FIG. 1 indicates an aircraft capable of hovering—in the example shown, a helicopter. Aircraft 1 comprises a main rotor 2 and a tail rotor 3. Main rotor 2 controls the main blades, and comprises an actuator assembly 4 for controlling the attack angle of the main blades; and, similarly, tail rotor 3 comprises an actuator assembly 5 for controlling the attack angle of the tail blades. Controlling the attack angle of the main rotor 2 and tail rotor 3 blades controls the attitude of aircraft 1. Actuator assemblies 4 and 5 are hydraulic, and preferably comprise a number of linear actuators 6 and 7 respectively.

Aircraft 1 comprises a hydraulic circuit defined by a pump 8, and by a number of lines 9 between pump 8 and actuator assemblies 4 and 5.

Pump 8 is designed to deliver a first flow when hydraulic circuit pressure is above a presettable threshold value.

Pump 8 is advantageously designed to deliver a second flow greater than the first flow, and aircraft 1 comprises a number of sensors 11a, 11b, 12, 13 for detecting a quantity associated with the control pressure of actuators 6, 7; and a programmable central control unit 10 for controlling pump 8 to deliver the second flow when the quantity detected by sensors 11a, 11b, 12, 13 corresponds to a control pressure of actuators 6, 7 below the threshold value.

If applied to an existing aircraft 1 for requalification, pump 8 has a maximum operating pressure higher than the certified work pressure of the hydraulic circuit. This work pressure is referred to as "rated discharge pressure" in certification standard no. MIL-P19692 governing military aircraft 1; and similar certification standards exist for civil aircraft 1.

Sensors 11a, 11b detect the work pressure of actuators 6, 7; load sensor 12 is fitted to actuator assembly 4, and detects the drive force of actuator 6; and load sensor 13 is fitted to actuator assembly 5, and detects the drive force of actuator 7.

Load sensors 12, 13 and pressure sensors 11*a*, 11*b* are connected, and supply data, to central control unit 10. Pump 8 is preferably a variable-displacement pump, and comprises a control device 14 connected to central control unit 10 to control the flow of pump 8. In other words, the flow of pump 8 is adjustable by central control unit 10.

The hydraulic circuit comprises an interface module 15 located in the cockpit of aircraft 1, and which is programmed to test operation of central control unit 10, and has a number of pilot-controllable light and/or sound indicators.

Figure 2:
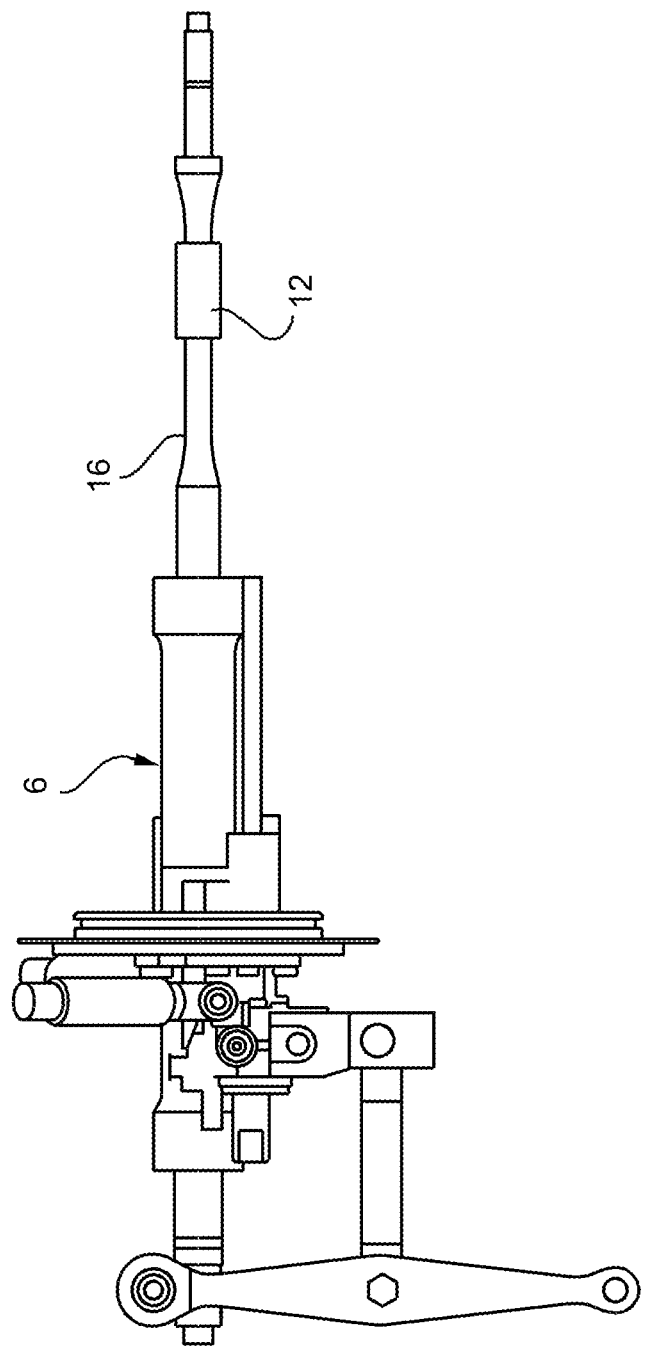
FIGS. 2, 3 and 4 show details of respective component parts of the FIG. 1 circuit.

FIG. 2 shows one of actuators 6 for controlling the attack angle of the main rotor 2 blades. Load sensor 12 is mounted to detect any irregularity in the force applied by actuator 6 to a known blade tilt angle adjusting mechanism (not shown), e.g. is fitted to a rod 16 of linear actuator 6, and comprises at least one strain gauge sensor, and preferably a number of strain gauge sensors mounted in a bridge circuit, e.g. a Wheatstone bridge circuit, to amplify the recorded signal.

Figure 3:
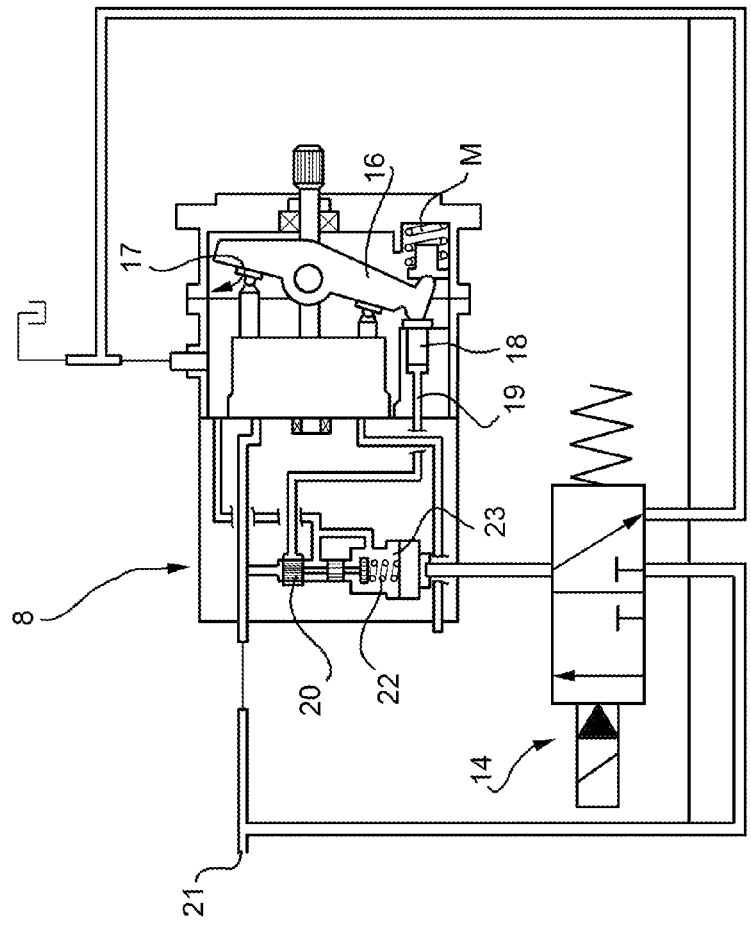
Figure 4:
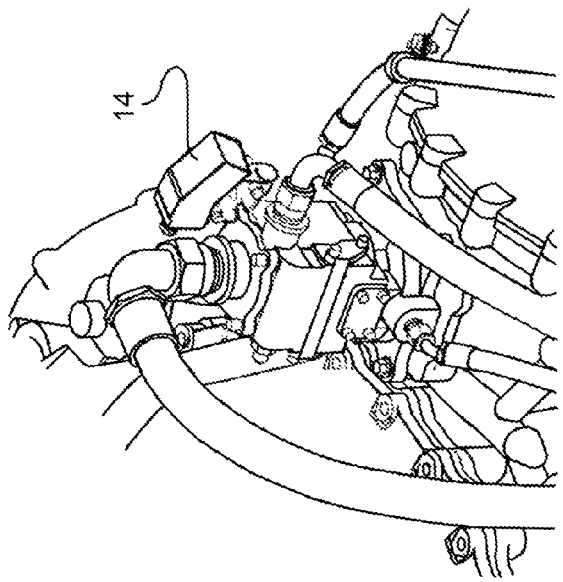

FIG. 3 shows an operating diagram of pump 8. Pump 8 is an axial-piston type with axial pistons rotating on a disk 16 rotating about an axis; and the disk and pistons are housed in a chamber 17 connected to a drain tank (not shown). Rotary disk 16 is operated by a drive circuit comprising a piston 18, which acts on the disk to adjust its tilt angle; a spring M, which acts in opposition to piston 18 to keep disk 16 in a maximum-delivery position; a conduit 19 for transferring delivery pressure to piston 18; and a slide valve 20 for adjusting pressure between a delivery 21 and piston 18.

More specifically, spring M and piston 18 cooperate with respective portions of disk 16 eccentric with respect to the rotation axis of disk 16.

A spring 22 keeps slide valve 20 in such a position as to close conduit 19 and cut off delivery pressure to piston 18, and is housed in a chamber 23 that is connected to the tank or delivery 21 by control device 14. More specifically, spring 22 and chamber 23 are designed so that, when chamber 23 is connected to delivery 21, spring 22 positions slide valve 20 to close conduit 19, and, when control device 14 connects chamber 23 to the tank, the pressure of delivery 21 overcomes the preload of spring 22 and opens slide valve 20 so that conduit 19 is substantially at delivery 21 pressure. More specifically, spring M is preloaded so that the tilt angle of rotary disk 16 decreases when conduit 19 is at delivery 21 pressure.

Central control unit 10 is programmed to perform a boost cycle of a given length—preferably 30 seconds, at the end of which, control device 14 switches automatically to the normal operating position.

During the boost cycle, pump 8 delivers the second flow.

If irregularities are still recorded by load sensors 12, 13, the boost cycle can be repeated, so pressure is supplied long enough to complete the manoeuvre, but without overly taxing the system in peak-load conditions. In peak-load conditions, in fact, in addition to greater mechanical stress, the hydraulic fluid overheats, thus also producing thermal stress, which must not be allowed to exceed a given threshold, over and above which damage may result.

Interface module 15 has a manual control 30 for the pilot to operate control device 14 independently of central control unit 10.

In normal below maximum-flow operating conditions, pump 8 delivers the first flow, which is above the presettable threshold and still provides the hydraulic power, i.e. flow and pressure, demanded by actuators 6, 7 governing the devices on aircraft 1. Correct operation of actuators 6, 7 is monitored by pressure and load sensors 11*a*, 11*b*, 12, 13, so hydraulic circuit pressure is always above a presettable threshold stored in central control unit 10. In which case, control device 14 discharges chamber 23, so conduit 19 is at delivery 21 pressure, and piston 18 acts on rotary disk 16 to compress spring M and set pump 8 to less than maximum flow. In the event of exceptionally high power demand by actuator assemblies 4 and 5, e.g. because actuator assemblies 4 and 5 connected to the hydraulic circuit are operated simultaneously to perform particularly complex manoeuvres, hydraulic circuit pressure may fall below the threshold value and not be high enough to ensure correct operation of actuators 6 and 7. This fall in pressure is detected by pressure sensors 11*a*, 11*b* along the hydraulic circuit, and even more readily by load sensors 12, 13 on actuators 6 and 7.

Upon central control unit 10 receiving anomalous signals from load sensors 12, 13, control device 14 switches to connect chamber 23 to delivery 21 pressure, and conduit 19 is discharged. Piston 18 is thus depressurized, and spring M moves rotary disk 16 into the maximum-tilt, i.e. maximum-flow, position, thus increasing hydraulic circuit pressure to provide the necessary hydraulic power to operate all the hydraulic devices involved in the manoeuvre.

The advantages of the present invention are as follows.

When sensors 11*a*, 11*b*, 12, 13 detect a fall in hydraulic circuit pressure below the threshold value, e.g. in the event of complex manoeuvres, central control unit 10 controls pump 8 to deliver the second flow and restore hydraulic circuit pressure above the threshold value.

By so doing, it is possible, for example, to perform complex manoeuvres while maintaining full control of aircraft 1.

Using sensors 11*a*, 11*b*, 12, 13, poor operating force of actuators 6 and 7 can be detected immediately, so the aircraft is always controllable, even in extreme conditions.

Maximum displacement, i.e. maximum flow, of pump 8 is achieved when the preload of spring M exceeds the load of piston 18, thus reducing response time to switch to the maximum-flow configuration.

The fact that pump 8 delivers the second flow, corresponding to an increase in hydraulic circuit pressure, for a given time period prevents overtaxing the circuit components, and is also a contributory factor in meeting National Aviation Board regulations waiving recertification of the hydraulic circuit, if pump 8 and central control unit 10 are mounted as part of a requalification of an operating aircraft. In the latter case, the maximum pressure of pump 8 must be between the work pressure and the maximum pressure for which the hydraulic circuit was certified.

In which case, central control unit 10 of aircraft 1 can be reprogrammed to only boost-operate pump 8, i.e. when control chamber 14 discharges chamber 23, in emergency conditions and for a limited length of time, so recertification of the hydraulic circuit is no longer necessary, while still enabling connection of upgraded devices to the circuit.

Clearly, changes may be made to aircraft 1 as described and illustrated herein without, however, departing from the protective scope defined in the accompanying Claims.

In particular, the same principle also applies to fixed-wing aircraft, in which the hydraulic circuit is connected to actuators of an in-flight attitude control system, such as flaps and/or the tail rudder.

Aircraft 1 may also be a convertiplane.

The invention claimed is:

1. An aircraft comprising:
   at least one in-flight attitude control system, comprising at least one actuator;
   a hydraulic circuit connected to said at least one actuator and comprising at least one pump adapted to deliver a first flow when the pressure of the hydraulic circuit is above a presettable threshold value, wherein said pump is adapted to deliver a second flow greater than said first flow, said second flow providing a pressure of the hydraulic circuit greater than a certification pressure of the hydraulic circuit;

a sensor adapted to detect a quantity associated with the pressure of said hydraulic circuit; and a programmable central control unit, which controls said pump to deliver said second flow when said quantity detected by said sensor corresponds to a pressure of said hydraulic circuit below said threshold value;

wherein said central control unit is adapted to control said pump to deliver said second flow for a predetermined length of time during a boost cycle, in the event of exceptional power demand by said actuator, and said control unit is adapted to automatically switch said pump to said first flow, at the end of said boost cycle;

wherein said pump is a variable-displacement axial-piston pump having a delivery, said pump comprising:

a disk defining a tilting axis about which the disk tilts, wherein a tilting angle of the disk about the tilting axis controls the flow output by the pump;

a first spring acting against the disk;

a hydraulic piston that cooperates with the disk eccentrically with respect to said tilting axis, said hydraulic piston adapted to operate in opposition to said first spring to control the tilting angle of said disk with respect to said tilting axis;

a conduit adapted to transfer pressure to said hydraulic piston;

a valve housed in a chamber;

a second spring acting on said valve; and a control device controlled by said central unit and normally set in a first position in which the control device connects said chamber to a tank, said second spring and said chamber adapted so that, when said chamber is connected to said tank, said valve opens said conduit so that said conduit is at the pressure of said delivery;

said first spring being pre-loaded to bias said disk so the tilting angle is less than a maximum tilting angle when said conduit is at the pressure of said delivery;

said pump adapted to deliver said first flow when said chamber is connected to said tank;

wherein when said sensor detects a fall in the pressure of said hydraulic circuit, said central unit is adapted to switch said control unit to a boost position for a predetermined length of time by connecting said chamber to said delivery;

wherein when said chamber is connected to said delivery, said valve closes said conduit, said piston is depressurized, and said disk is moved into a maximum-tilt position causing said pump to deliver said second flow.

2. An aircraft as claimed in claim 1, wherein said sensor is a load sensor connected to said actuator to determine the load on said actuator.

3. An aircraft as claimed in claim 2, wherein said sensor comprises a strain gauge sensor.

4. An aircraft as claimed in claim 1, wherein said sensor is adapted to determine the pressure of said hydraulic circuit.

5. An aircraft as claimed in claim 1, further comprising a pilot-controlled interface having a pilot-operated control adapted to control said pump to deliver said second flow.

6. An aircraft as claimed in claim 1, wherein said aircraft is a helicopter comprising at least one of a main rotor and a tail rotor;

said in-flight attitude control system comprising an assembly adapted to control a blade attack angle of at least one of a main rotor and a tail rotor.

7. An aircraft as claimed in claim 1, wherein said first spring and said hydraulic piston are adapted so the load of the spring is greater than the load of the hydraulic piston when said pump delivers said second flow.

* * * * *